Figure 1:
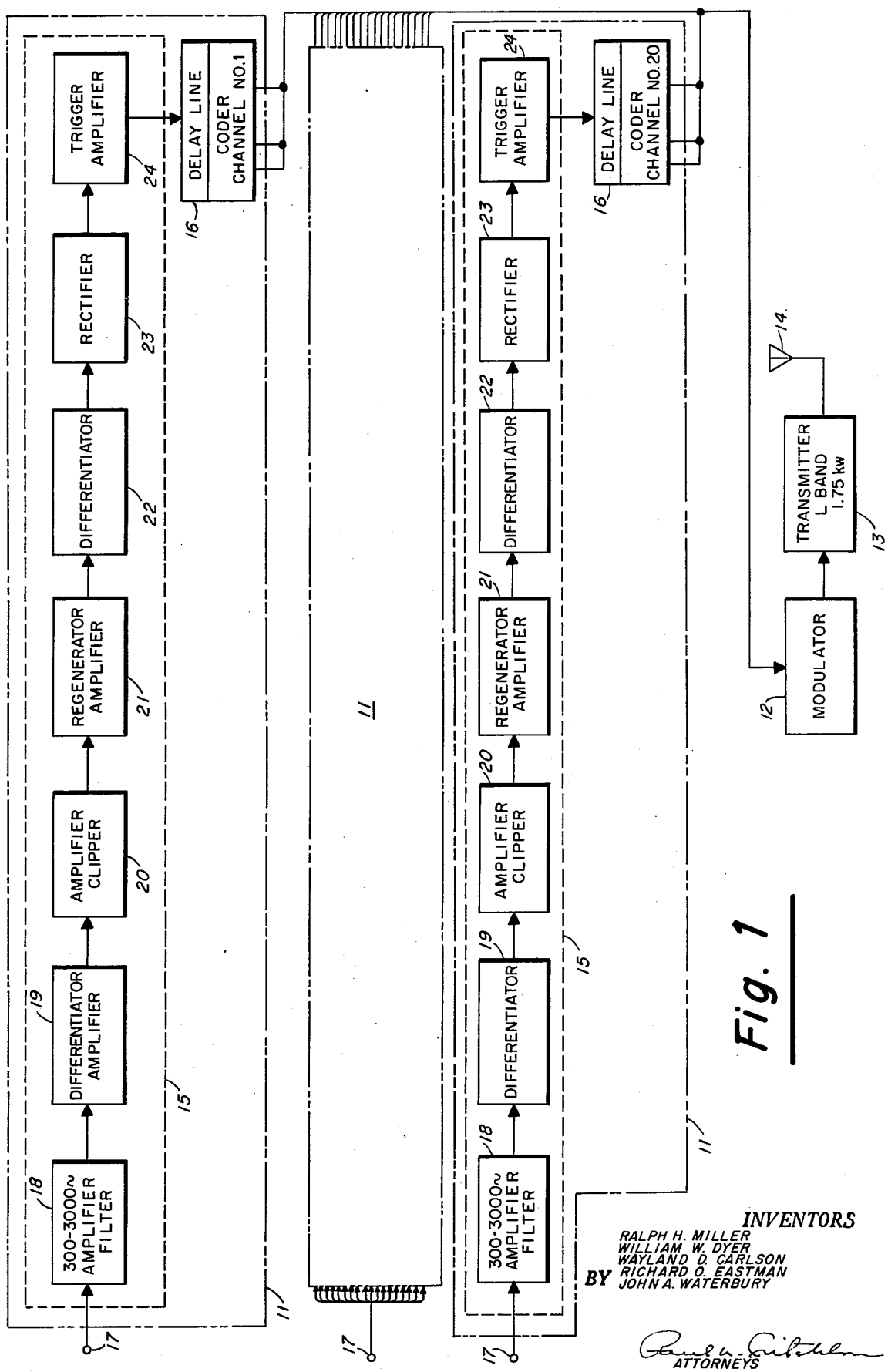

United States Patent [19]

Miller, Jr. et al.

[11] 4,071,826
[45] Jan. 31, 1978

[54] CLIPPED SPEECH CHANNEL CODED COMMUNICATION SYSTEM

[75] Inventors: Ralph H. Miller, Jr.; William W. Dyer, both of La Mesa; John A. Waterbury, San Diego; Wayland A. Carlson, San Diego; Richard O. Eastman, San Diego, all of Calif.

[73] Assignee: The United States of America as represented by the Secretary of the Navy, Washington, D.C.

[21] Appl. No.: 106,413

[22] Filed: Apr. 27, 1961

[51] Int. Cl.² .............................................. H04B 1/00
[52] U.S. Cl. ................................. 325/39; 179/15 AP; 325/43; 325/44
[58] Field of Search .......... 179/15.6, 15 APC, 15 AP; 343/176, 203; 325/39, 42, 43, 44, 45

[56] References Cited

U.S. PATENT DOCUMENTS

| | | | |
|---|---|---|---|
| 2,779,933 | 1/1957 | Bradburd | 179/15 AP |
| 2,829,346 | 4/1958 | Hughes et al. | 332/9 R |
| 2,962,553 | 11/1960 | Halina | 325/43 |
| 2,974,281 | 3/1961 | Feldman | 324/77 H |
| 2,985,715 | 5/1961 | Campbell | 179/15 AP |

*Primary Examiner*—S. C. Buczinski
*Attorney, Agent, or Firm*—Richard S. Sciascia; Paul N. Critchlow; Roy Miller

EXEMPLARY CLAIM

9. A clipped speech channel coded communication receiver comprising: input means for receiving radiated energy containing trains of pulses therein; channel decoder means operatively connected to said input means and comprising means for receiving said trains of pulses and retaining said trains of pulses; a multiplicity of channel coincidence circuit means operatively connected to the output of said channel decoder means for selecting a coded train of pulses corresponding to a particular channel input and producing an output pulse when the coded train of pulses is coincident therein; intelligence restoring means each restoring means being operatively connected to each of said coincidence circuit means and comprising means for converting output pulses from said coincidence circuit means to a clipped waveform; and output means operatively connected to said converting means for reproducing intelligence corresponding to an original composite waveform.

10 Claims, 7 Drawing Figures

CLIPPED SPEECH CHANNEL CODED COMMUNICATION SYSTEM

The invention described herein may be manufactured and used by or for the Government of the United States of America for governmental purposes without the payment of any royalties thereon or therefor.

The present invention relates to a communications system and more particularly to a nonsynchronous pulse communications system.

In approaching the problem of providing a suitable system for communications, various types of multiplexing systems and multipulse systems were investigated to determine if any would give satisfactory communications through heavy interference and jamming. However, all of the multipulse systems investigated presented serious problems because of the synchronization signals necessary between the unit stations. Although high-power radio frequency links tend to reduce this difficulty, if the synchronization signal is jammed or blocked, the system becomes useless. In addition, in a multipulse system utilizing synchronization signals, even though no channels of the system are in operation, RF energy is still radiated.

Therefore, the present pulse system is presented wherein multiplexing is accomplished without the use of synchronous signals between any of the stations, thereby offering the following advantages. Due to the lack of synchronization signal there is no danger of jamming or blocking the non-present synchronization signal thereby rendering thereby rendering the system useless; and further, when none of the channels of the system are in operation, no RF energy is radiated, thereby resulting in lower average power output.

Therefore, an object of the present invention is to provide a communications system which will give satisfactory communications through heavy interference and jamming.

A further object of the invention is to provide a pulse communications system which will give satisfactory communications through heavy interference and jamming.

A further object of the invention is to provide a nonsynchronous multipulse communications system.

Another object of the present invention is to provide a multiplexed non-synchronous communications system.

A further object of the present invention is to provide a multiplexed non-synchronous system which is relatively jam resistant.

Another object of the present invention is to provide a non-synchronous multiplexed communications system which has a low average power output.

Another object of the present invention is to provide a non-synchronous multiplexed communications system wherein the transmitted power is dependent upon the presence of information on any one of the channels of the system.

Another object of the invention is to provide a non-synchronous multiplexed transmitter system.

A further object of the invention is to provide a receiver system capable of receiving multiplexed nonsynchronized pulse trains.

A further object of the invention is to provide a multipulse transmitter system for generating groups of pulses or trains at the crossover points of the input waveform.

Another object of the invention is to provide a multipulse communications system coded communcations system wherein receiving systems are provided to receive unique groups of pulses.

Various other objects and advantages will appear from the following description of the invention, and the novel features will be particularly pointed out hereinafter in connection with the appended claims.

The objects and advantages of the present invention are obtained through the use of a communications system utilizing pulse modulation wherein the pulses are generated at the crossover points of the frequency component of a composite waveform containing intelligence therein. When generating the pulses corresponding to the crossover points, the composite waveform components, consists of amplitude information and frequency information. Frequency information is retained and amplitude information is eliminated through a technique referred to as "infinite clipping".

The system is designed to handle a multitude of channels and requires multiplexing, therefore requires a multiplexing technique. No synchronizing signal is used, therefore the transmitter is in operation only when there is intelligence present on one of the channels, thereby keeping average power requirements at a minimum. The receiver portion of the system is designed to accept the pulses representing frequency information in the original composite waveform and process this information in such a fashion that a waveform is reproduced in the output of the receiver which substantially approximates the original waveform at the input to the transmitter.

Figure 2:
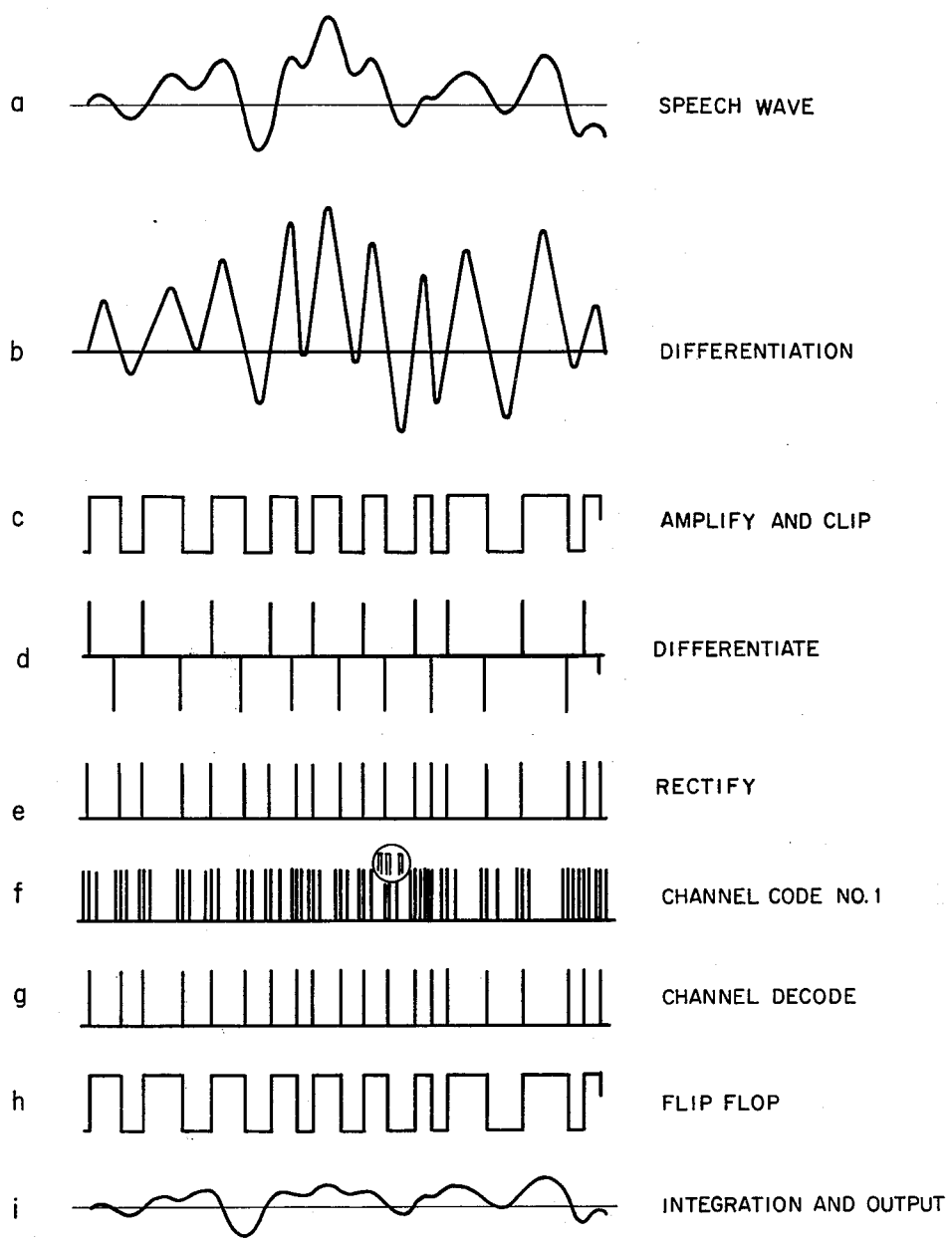
Figure 3:
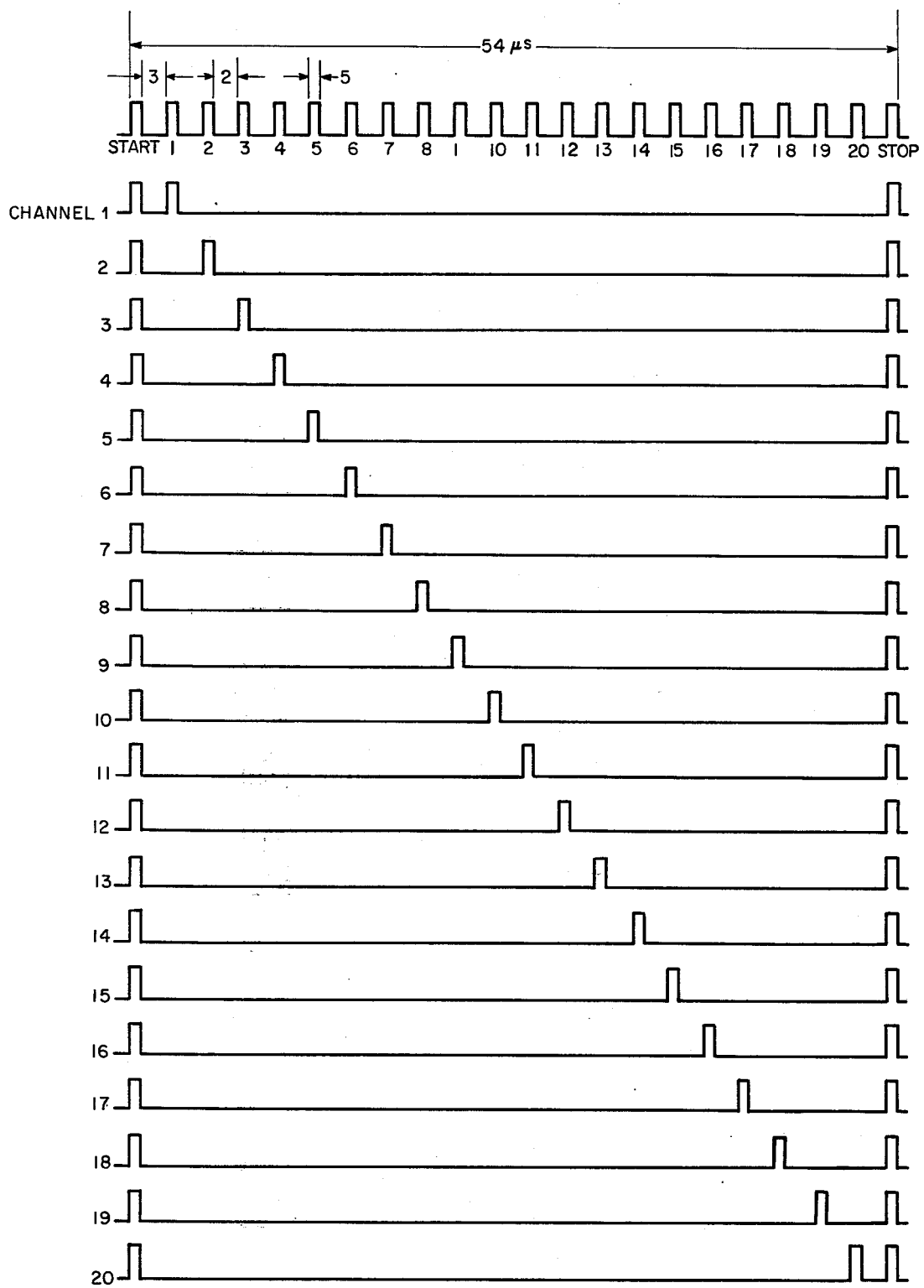
Figure 4:
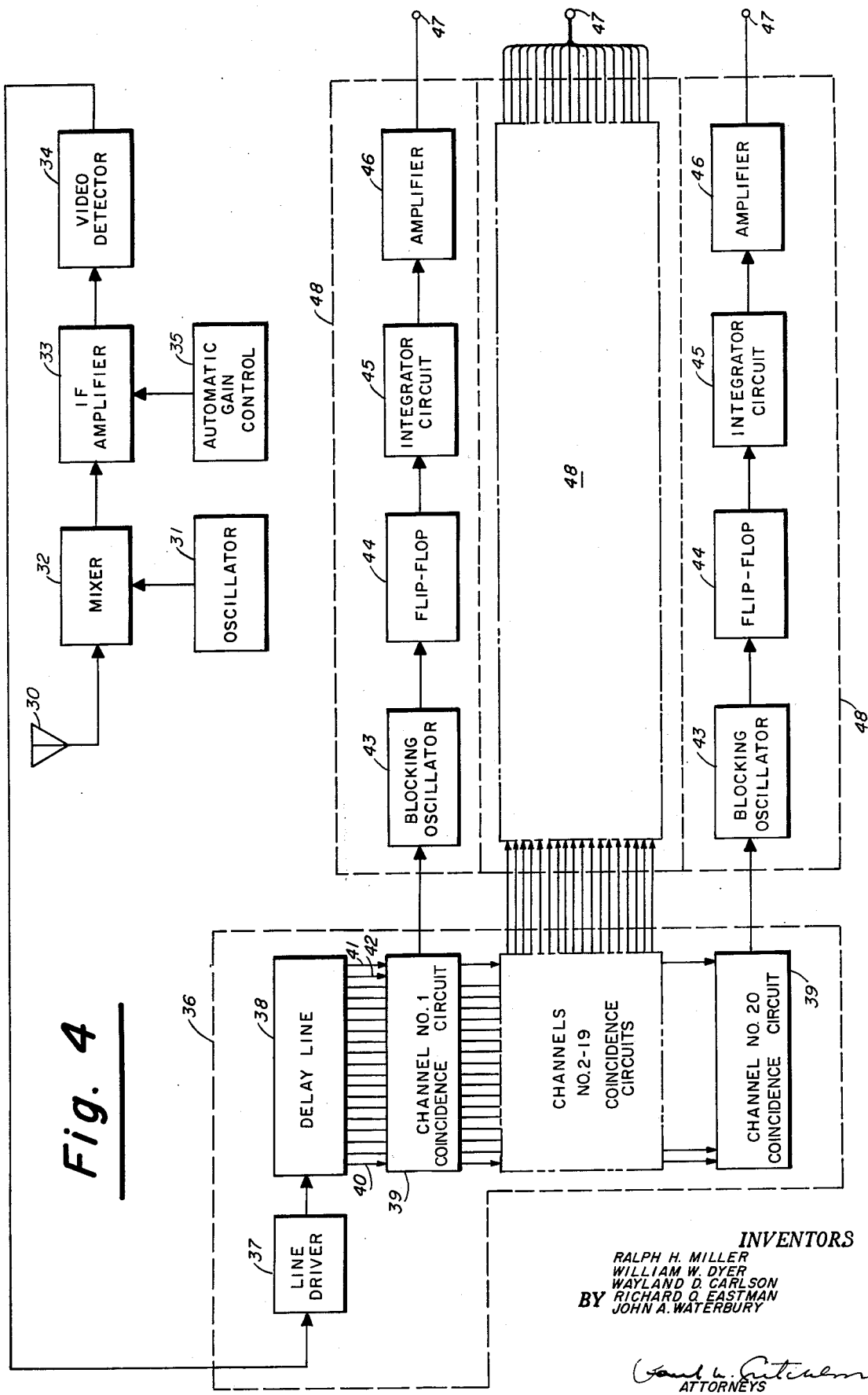
Figure 5:
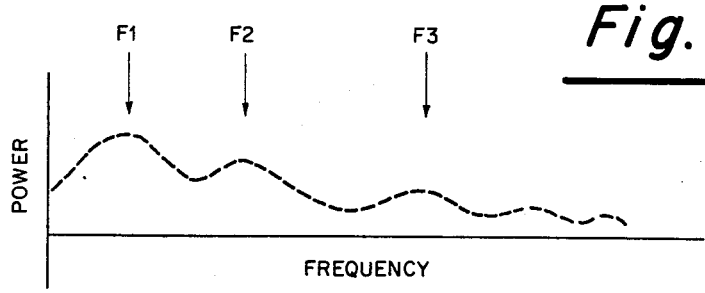
Figure 6:
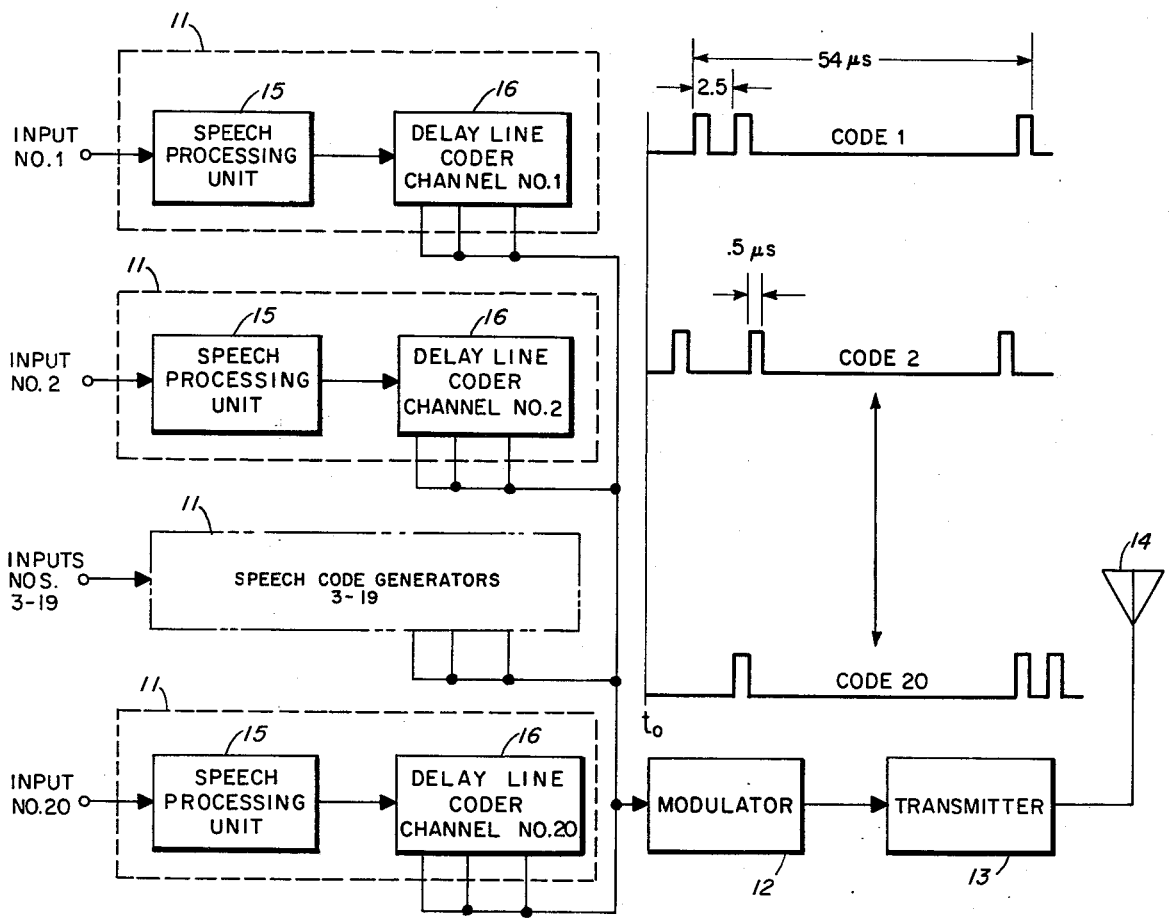
Figure 7:
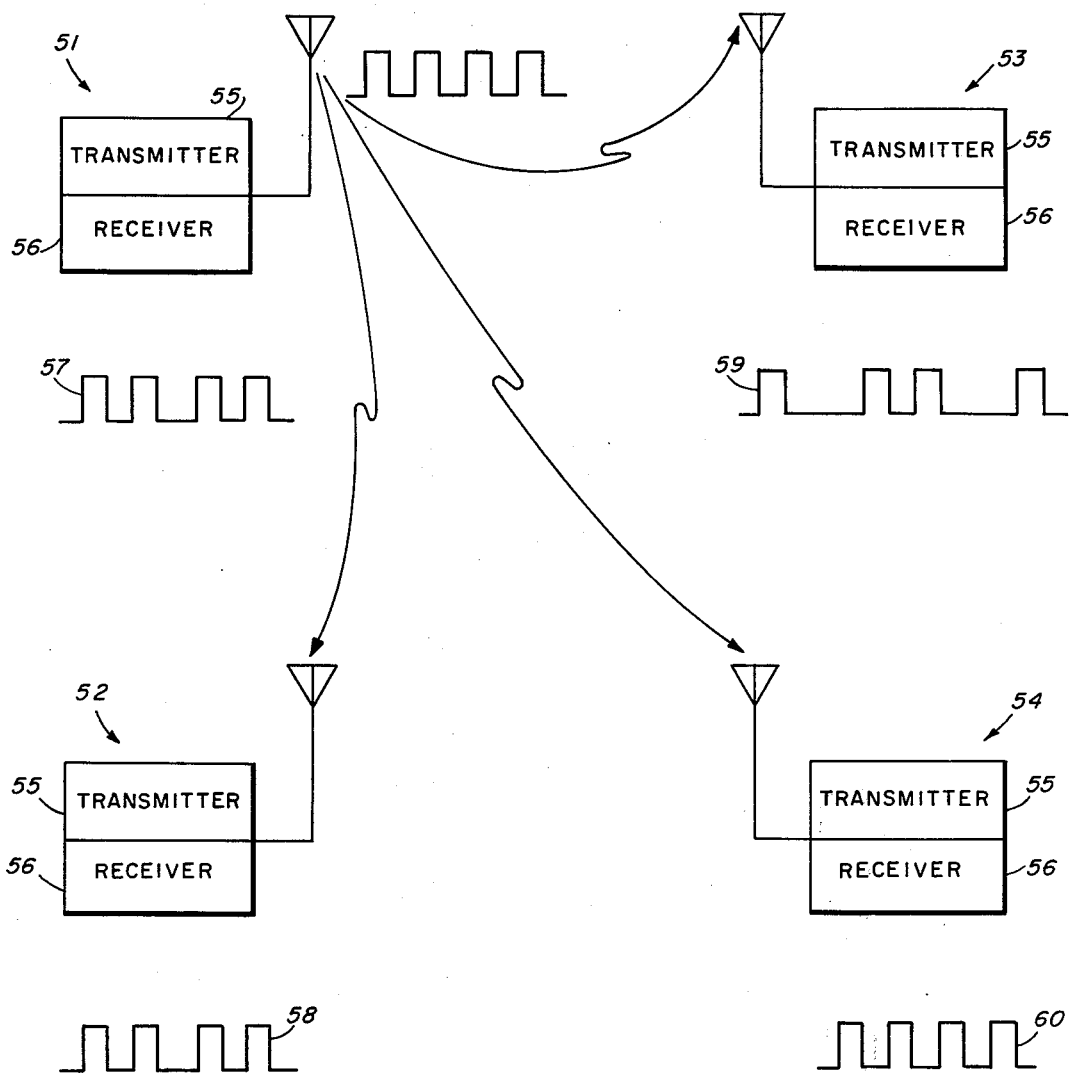

Reference is now made to the following description taken in conjunction with the accompanying drawings in which:

FIG. 1 is a block diagram of the transmitter terminal;
FIG. 2 is a diagram of the waveforms at various points in the system;
FIG. 3 is a diagram of the channel codes which would appear on the transmitter terminal;
FIG. 4 is a block diagram of the receiver terminal;
FIG. 5 is a diagram of the spectral distribution of voiced speech signal energy;
FIG. 6 is a block diagram of the transmitter terminal illustrating possible pulse trains present simultaneously;
FIG. 7 is a simplified block diagram of a system for addressing communications to desired stations.

The system will be described in conjunction with the drawings wherein like numerals indicate like parts. Referring to FIG. 1, there is shown the transmitter terminal of the non-synchronous pulse modulated communications system which comprises a multitude of speech code generator units 11 through $11^n$; a modulator 12 capable of accepting pulses from the speech code generators, which is used to modulate a transmitter 13 which in turn radiates energy into space through an antenna system 14. The speech code generator units 11 through $11^n$ further may be broken down into a speech processing unit 15 which generates pulses corresponding to frequency crossover points in the original input waveform and a channel coder unit 16 which accepts individual pulses and generates a channel code, i.e., generates a train of pulses corresponding to a particular code.

The system described in the present invention will be described with reference to a system designed to accommodate 20 multiplexed channels between two stations and designed to accept voice modulation, however, facsimile or teletype may be used by utilizing appropriate converters. Voice modulation is used in the description in that it is the most difficult means of transmitting intelligence, i.e., is is more difficult to handle voice than it is facsimile or teletype. The system will be further described with reference to a single channel rather than referring to the complete 20 channel system.

In dealing with speech sounds it has been determined that most of the significant information content of speech is contained in the frequency regions from 0 to 3,000 cycles, or with reference to FIG. 5, the first three formants corresponding to F1, F2 and F3. FIG. 5 illustrates the spectral energy distribution of representative voice sound wherein the pitched frequency and its harmonics are shown in dotted lines, while the broader peaks of energy correspond to formants, resulting from the influence of the transmission characteristics of the individuals vocal cavity. Most of the significant information content of speech is contained in the frequency regions covered by the first three formants in a dynamic amplitude range from −12 to −28 db around an average level which is primarily determined by the speaker's natural characteristics and his surroundings. The speaker's animation and recognition, or voice quality is due mainly to the voiced character inflection of the pitched spectrum which goes considerably beyond the first three frequency formants and amplitude range to 60 db. In that the first three formants corresponding to F1, F2 and F3 contain the main portion of the significant information content of the speech, the speech code generators 11 are designed so that the first three formants are the only ones processed therein.

With reference to FIG. 2, let it be assumed that a speech wave as shown in 2(a) is coupled to a channel input 17 of a speech code generator. A high-pass filter amplifier 18 designed to pass and amplify frequencies from 300 to 3,000 cycles is operatively connected to the channel input. The input signal is introduced into the filter amplifier and amplified prior to extreme clipping. When two or more frequency signals are present in a composite waveform, the weaker signals are suppressed if the signal undergoes extreme clipping. Since, as shown in FIG. 5, the power or amplitude of either formant 2 or 3 is less than that of formant 1, severe clipping may eliminate the intelligence contained in formants 2 and 3 as well as higher formants unless amplitude compensation is added. It can be shown that the average speech power spectrum has a falling characteristic of approximately 9 db per octave from 500 cycles to 4,000 cycles, therefore, a pre-emphasis, such as network 18, having a rising frequency characteristic of approximately 9 db per octave through the above frequency range is used to provide the necessary compensation.

The output of the amplifier filter 18 is introduced into a differentiator amplifier 19 wherein many more crossovers of the original speechwave are introduced into the intelligence signal. This is shown in FIG. 2(b), which illustrates the output from differentiator amplifier 19. The waveform as shown in FIG. 2(b) is then introduced into the amplifier clipper 20 which maintains the crossover points of the original differentiated wave and reduces the noise factor. The smallest signal to be clipped in the amplifier clipper 20 determines the clipping level when clipping a waveform of varying amplitude. If the clipping level is fixed, then the smallest signal determines the amount of amplification necessary prior to the amplitude clipping. Since the major information content of speech signals is contained in a dynamic range of 40 db, the minimum amplification required is therefore 40 db. In that the average level of speech also varies, another 20 db of gain is added for compensation, resulting in a total gain of 60 db prior to the infinite clipping. This amplification is obtained through the use of a single resistance-coupled amplifier and two cathode-coupled symmetrical clipper amplifiers contained in the amplifier clipper system 20.

The advantages gained through the utilization of the amplifier and clipping circuitry as set forth in the speech processing section are the recovery time of the circuits after clipping is determined only by the signal input, a symmetrical output may be obtained, and improved steepness of the leading and lagging edges of waveform is obtained because of feedback. Further, the circuits have high input and output impedances which facilitate clipping, the number of tubes and components is reduced in comparison with other types of amplifier clippers, and circuit noise is minimized.

A speech wave may experience extreme clipping following pre-emphasis while losing only a small percentage of the intelligence contained therein. However, in order to achieve this clipping without loss of intelligence, a large degree of amplification is necessary. This amplification is applied not only to the speech, but also inevitably to hum and noise that occur between words. Therefore, if a pulse were generated for every amplitude transition, whether it be noise or speech, a very noisy, inefficient, and high-duty-cycle system would result. Therefore, it is desirable that circuit-generated noise be reduced as much as practicable and in order to do so some form of noise suppression is necessary. A regenerative amplifier 21 accomplishes this function by acting as a base clipper to suppress more noise than signal. In operation, the regenerative amplifier is essentially a bistable device. The audio signals vary about a quiescent level and when they reach a predetermined level they trigger the regenerative amplifier to the on state. When they return to the quiescent level they trigger it to the off state, and as a result, a series of rectangular waveforms are generated. The widths of the waveforms are determined by the frequency of audio transitions and hence, the output waveform contains primarily the frequency information of the originating audio signals. The output signals also contain some amplitude information, in the form of a frequency shift, due to the finite rise-fall time of the audio wave. However, for all practical purposes the audio signal has been infinitely clipped, i.e., amplitude variations have been removed. FIG. 2(c) illustrates the output rectangular waveform from regenerative amplifier 21.

The output rectangular pulses from the regenerative amplifier 21 are then differentiated in a differentiator 22 to produce the output corresponding to FIG. 2(e). The output of differentiator 22 comprises a string of pulses corresponding to the frequency information in the original composite waveform at the input.

When a rectangular waveform is differentiated, a positive and a negative pulse are generated as shown in FIG. 2(e), however, in order to utilize these pulses in the subsequent system, they must be unidirectional; hence the differentiated output of the differentiator 22 is rectified in a rectifier 23. The rectified pulses are then fed to a trigger amplifier 24 wherein a series of output pulses are generated having uniform width. The output of the trigger amplifier 24 is a pluse, 0.5 microsecond in width and having a peak amplitude of 70 volts.

The output pulses from trigger amplifier 24, corresponding to the crossover points of the original waveform and containing the frequency information of the original composite wave, are then introduced into a channel coder 16 which consists of a delay line so constructed that it has delay taps in accordance with a code shown in FIG. 3. For channel one being described, a three pulse code is generated in the channel coder for each of the output pulses from the trigger amplifier, which is initially controlled by the original intelligence wave as introduced into the input terminals 17 of the speech code generator. A waveform corresponding to the channel code for channel one is shown in FIG. 2(f) wherein each of the individual pulses of FIG. 4(e) has been converted into a train of three pulses corresponding to the channel code as shown in FIG. 3.

With reference to the channel one code, when a pulse is introduced into the delay line, a start pulse 0.5 microsecond wide is generated and 2.5 microseconds after the introduction of the pulse another pulse 0.5 microsecond wide is generated corresponding to the intelligence, and 53.5 microseconds after the introduction of the pulse into the delay line a stop pulse 0.5 microseconds wide is generated.

The trains of pulses for the corresponding channels from the outputs of the various channel coders are then introduced into the modulator 12. The modulator drives the L-band transmitter 13 and from there the pulse trains are radiated into space from antenna 14.

Therefore, it can be seen that the nineteen other channels, which are identical with the channel one apparatus, may be used to generate unique trains of pulses corresponding to channel codes containing information which may be multiplexed and introduced into a single transmitter. From this it can be seen that the transmitter will be energized upon intelligence being present in any one of the channels due to the fact that there is no synchronizing pulse utilized.

FIG. 6 is a diagramatic showing of the speech processing unit 15, delay line channel coder 16, modulator 12, transmitter 13 and antenna 14 illustrating pulse trains that might be introduced into the input of modulator 12 starting with a time, $t_o$. As can be seen from FIG. 6 the energizing of modulator 12 is only dependent upon the presence of pulses on any one of the twenty channels in the system.

On the receiving end of the system, rf energy is received on antenna 30 and is coupled to a receiver unit, for example, a modified AN/APX-6 receiver of the superheterodyned type operating in the L band of frequencies which has a sensitivity of 70 dbm and a bandwidth of 10 megacycles at 6 db down from maximum.

The received signals are mixed with the output of a local oscillator 31 in a mixer 32 resulting in an intermediate signal of 59.5 megacycles. This signal is then amplified in amplifier 33 and detected in video detector 34 thereby producing the original transmitted pulse train configurations. Automatic gain control is obtained through agc circuits 35. The output pulses from the video detector 34 are then introduced into the channel decoder 36 comprising a line driver 37, a delay line 38 and a number of channel coincidence circuits 39 corresponding to the number of channels desired. The present embodiment contemplates twenty channels, therefore, twenty channel coincidence circuits are provided.

The output pulses from the video detector are introduced into the line driver 37 wherein they are amplified and matched to the input of the delay line 38. Delay line 38 is tapped in accordance with the codes as shown in FIG. 3 therefore, as the three pulse codes pass through the delay line and the proper positions are reached in accordance with the delay taps, the three pulses from the delay line coincide in the channel coincidence circuit for the appropriate channel and produce a positive pulse in the output of a coincidence circuit. It must be remembered that simultaneously, codes from twenty channels are fed into the delay line and are made coincident by proper channel taps on the delay line.

Looking at the coincidence circuit corresponding to channel one, the delay line is constructed so that line 40 corresponding to a stop pulse in the original transmitted pulse train, line 41 corresponding to a start pulse in the original code, and line 42 corresponding to the intelligence all will be present in the coincident circuit for channel one simultaneously. Therefore, due to the fact that the coincident circuit functions as an And gate there will be an output pulse generated. The same is true for channels 2 through 20. Channels 1 and 20 are shown in FIG. 4 wherein arrows have been placed on lines corresponding to the stop, start, and intelligence pulses for the particular channel code.

The output of the coincidence circuits is then fed into a number of audio restorer circuits 48 corresponding to the number of channel coincidence circuits. The audio restorer circuit consists of a blocking oscillator 43 for receiving pulses corresponding to FIG. 2(g) from the coincidence circuit and amplifying the pulses. In addition, the blocking oscillator 43 provides isolation between the audio restorer and coincidence circuit. The output of the blocking oscillator is then coupled to a flip-flop circuit 44 wherein the flip-flop fires positive on one pulse and then negative on the next, thus, restoring the original differentiated clipped intelligence signal to the waveform corresponding to FIG. 2(h). The restored rectangular intelligence signal is then fed into an integrator circuit 45 which reduces the harshness and improves the quality of output signals, especially when voice is being transmitted. From the integrator the signal is fed to an output amplifier 46 and from there to output terminal 47 and finally distributed to the appropriate terminal equipment.

Referring to FIG. 2 the train of pulses of FIG. 2(f) corresponding to the channel code for channel one would appear at the output of the line driver. The chain of pulses as shown in FIG. 2(g) would appear at the output of coincidence circuit 39 for channel one and the square wave as shown in FIG. 2(h) would correspond to the output of the flip-flop 44. The integrated output appearing at the output terminal 47 would correspond to the waveform of FIG. 2(i) as can be seen, is fairly representative of the original speech wave of FIG. 2(a).

In that all twenty channels are transmitting at random, as shown in FIG. 6, there is a probability that there will be garble, i.e., a mark of one code filling in the blank of another, or interference between channels. However, this probability has been calculated and amounts to 1.7 percent. In the present system the peak power output of the transmitter is 1725 watts at the L band of frequencies and the duty cycle has been calculated to be 14.1 percent, which leads to an average power requirement of 243 watts.

The above system has been described in connection with a single transmitter and receiver, each of which is capable of handling 20 channels. However, the system may be modified as shown in FIG. 7 to provide for a means for addressing to allow communication to be directed from the transmitter or transmitters to a particular station's receiver.

FIG. 7 is a simplified block diagram of the proposed system whereby a communication is addressed to a particular receiver system. Individual communications units are indicated at 51, 52, 53, and 54, each unit consisting of a transmitter 55 and receiver 56. The transmitters are of the type disclosed in FIG. 1 of the present invention. However, receivers 56 of communications units 51, 52, 53, and 54,respectively, will consist of only one channel of the receiver system as set forth in FIG. 4. This would include units 30, 31, 33, 34, 35, 37, 38, one channel unit 39, and one audio restorer circuit 48. Each of the receivers has a particular train of group of pulses which it may receive as shown at 57, 58, 59 and 60.

In the operation of the complete net, any one of the units 51, 52, 53 and 54 may talk to any other of the units. For example, if unit 51 desires to communicate with unit 54, a particular code is transmitted by transmitter 55 of unit 51, which is the address of unit 54 and will be received and converted into audio, in the present example, in receiver 56 of unit 54 as shown.

The same would hold for any other of the units, i.e., unit 53 could communicate with unit 52 by transmitting the group of pulses corresponding to the address of the receiver 56 of unit 52 and vice versa.

In the present example, by using a transmitter capable of multiplexing 20 channels, 21 different units such as 51, 52, 53 and 54 may be provided.

Therefore, it is seen that the present system accomplishes a technique wherein operation in the presence of high-pulse jamming is available due to the lack of synchronizing signals between stations. In addition, directional antennas between stations are used, which also reduces the probability of jamming.

The system is not secure, but it can be shown that if more than one channel is in operation at the same time, the garble of all channels makes non-system reception unintelligible. However, if only a single channel is operating, the pulse train spacing could possibly be interpreted by a listener not equipped with an appropriate receiver.

In addition, netting would be possible between a master station and several sub-stations or all of the individual stations as disclosed.

Obviously many modifications and variations of the present invention are possible in the light of the above teachings. It is therefore to be understood that within the scope of the appended claims the invention may be practiced otherwise than as specifically described.

What is claimed is:

1. A clipped speech channel coded communications system comprising at least one transmitter section and at least one receiver section; each transmitter section containing at least one speech code generating means comprising; input means for coupling a signal to said speech code generating means, first differentiator means operatively coupled to the input means for producing crossover points corresponding to the frequencies contained in said signal, clipper means operatively coupled to said first differentiator means for infinitely clipping said waveform, pulse generating means operatively coupled to the clipper means for producing pulses corresponding to the zero crossover points of the input signal, channel coding means operatively coupled to said pulse generating means for producing coded trains of pulses for each pulse received therein in the absence of synchroninzation pulses; and transmitter means operatively coupled to the outputs of said speech code generators for radiating said coded trains of pulses; and receiver section comprising; input means for receiving and detecting trains of pulses; channel decoder means operatively coupled to said input means comprising, delay means for retaining said trains of pulses, a number of channel coincidence circuits corresponding to the number of channels operatively coupled to said delay means, each said coincidence circuit producing an output pulse therefrom when an appropriately coded train of pulses is coincident therein; and intelligence restoring means operatively coupled to each of said coincidence circuit means for producing a signal corresponding substantially to said original input signal.

2. A communications system comprising a transmitter section and receiver section; said transmitter section containing at least one speech code generator means comprising input means for coupling a composite waveform to the input of said speech code generator means, amplifier means coupled to said input means for passing a selected band of frequencies from said composite waveform and amplifying said band of frequencies, differentiator-amplifier means coupled to the output of said amplifier means for producing a signal having crossover points corresponding to the frequencies contained in the original composite waveform, clipper means coupled to the output of said differentiator-amplifier means for infinitely clipping the signal produced by said differentiator-amplifier and thereby removing noise and amplitude information and retaining frequency information; differentiating means coupled to the output of said clipper means for producing positive and negative pulses corresponding to the crossover points of the infinitely clipped waveform, rectifying means coupled to the output of said differentiating means for receiving said positive and negative pulses and producing pulses having a uniform polarity, trigger means coupled to the output of said rectifier means for receiving said pulses of uniform polarity and producing pulses having a uniform width, channel coder means comprising a delay line coupled to the output of said trigger means for producing a train of pulses for each input pulse from said trigger means; and transmitter means operatively connected to the output of said channel coder means for radiating said train of pulses; said receiver section comprising, input means for receiving radiated energy consisting of random trains of pulses; channel decoder means coupled to said input means comprising a delay line for receiving said trains of pulses; at least one coincidence means operatively connected to the output of said delay line for receiving a train of pulses corresponding to a particular channel input and producing an output pulse; and restoring means coupled to the output of said coincidence means comprising a flip-flop for converting output pulses from said coincidence means to the original clipped waveform; and output means operatively connected to said flip-flop for reproducing intelligence corresponding to said original waveform.

3. A communications system comprising a transmitter section and receiver section; said transmitter section containing at least one speech code generator comprising; input channel means for coupling a composite waveform representing intelligence to the input of said speech code generator means, differentiator-amplifier means operatively receiving said composite waveform for amplifying said composite waveform thereby producing a waveform having crossover points corresponding to the frequency of the original composite waveform, amplitude clipper means coupled to the output of said differentiator-amplifier means for infinitely clipping the wave-form produced by said differentiator-amplifier thereby removing the noise and amplitude information and retaining frequency information, differentiating means coupled to the output of said amplitude clipping means for producing pulses corresponding to the crossover points of the infinitely clipped waveform, trigger means operatively receiving the pulses from said differentiating means producing pulses having a uniform width; channel coder means comprising a delay line coupled to the output of said trigger means for producing a train of pulses for each input pulse from said trigger means; and transmitting means operatively coupled to the output of said channel coder for radiating said trans of pulses into space; said receiver section comprising; input means for receiving radiated energy containing trains of pulses, channel decoder means coupled to said input means comprising a delay line for receiving said trains of pulses, at least one coincidence means operatively connected to the output of said delay line for selecting a train of pulses corresponding to a particular channel input and producing a output pulse therefrom when pulses corresponding to the channel code and information are present simultaneously; restoring means coupled to the output of said coincidence means comprising means for converting output pulses from said coincidence means to the original clipped waveform; and output means operatively receiving said clipped waveform for reproducing the intelligence contained therein.

4. The communications system of claim 3 wherein said differentiating means includes means for producing pulses at the zero crossover points of the infinitely clipped waveform.

5. A nonsynchronous multipulse communication system comprising a transmitter section and receiver section; said transmitter section comprising at least one speech code generator including input means for receiving a composite waveform containing intelligence therein; pre-emphasis means operatively receiving said composite waveform for producing a signal having crossover points corresponding to the original composite waveform coupled to said input means, clipping means coupled to the output of said pre-emphasis means for infinitely clipping the output signal from the pre-emphasis means thereby removing noise and amplitude information and retaining frequency information contained in the original composite waveform, differentiating means operatively connected to the output of said clipping means for producing corresponding to the crossover points of the infinitely clipped waveform, channel coder means comprising a delay line operatively receiving the output of said differentiating means for producing a train of pulses for each input pulse received from differentiating means; and transmitting means operatively receiving the output of said speech code generators for radiating said train of pulses into space; said receiver section comprising; input means for receiving radiated energy containing trains of pulses; channel decoder means coupled to said input means including a delay line for receiving said trains of pulses; at least one channel coincidence circuit means operatively connected to the output of said delay line for selecting a train of pulses corresponding to a particular channel input and producing an output pulse; restoring means operatively coupled to each channel coincidence circuit means comprising means for converting output pulses from said channel coincidence means to the original clipped waveform; and intelligence output means operatively connected to said restoring means for reproducing intelligence corresponding to an original composite waveform.

6. The communication system of claim 5 wherein said differentiating means includes means for generating pulses at the zero crossover points of the infinitely clipped waveform.

7. A non-synchronous multipulse communications system comprising a transmitter section and receiver section; said transmitter section comprising a multiplicity of speech code generator means; each speech code generator comprising channel input means for coupling a composite waveform to the speech code generator, pre-emphasis means for producing a signal having crossover points corresponding to the frequencies contained in the original composite waveform, clipper means operatively the signal from the output of said pre-emphasis means for infinitely clipping the output signal from the pre-emphasis means thereby removing the noise and ampliiude information and leaving frequency information, pulse generating means operatively coupled to the output of said clipping means for producing pulses corresponding to the crossover points of the infinitely clipped signal, channel coding means operatively coupled to the output of said pulse generating means for receiving the output of said generating means and producing a coded train of pulses for each input pulse received from said pulse generating means; and transmitter means operatively coupled to the outputs of said multiplicity of speech code generators for receiving coded trains of pulses and radiating said trains of pulses; said receiver section comprising; input means for receiving radiated energy containing trains of pulses therein; channel decoder means operatively connected to said input means and comprising means for receiving said trains of pulses and retaining said trains of pulses; a multiplicity of channel coincidence circuit means operatively connected to the output of said channel decoder means for selecting a coded train of pulses corresponding to a particular channel input and producing an output pulse when the coded train of pulses is coincident therein; intelligence restoring means each restoring means being operatively connected to each of said coincidence circuit means and comprising means for converting output pulses from said coincidence circuit means to a clipped waveform; and output means operatively connected to said converting means for reproducing intelligence corresponding to an original composite waveform.

8. A clipped speech channel coded communications transmitter comprising; a multiplicity of speech code generator means; each speech code generator comprising channel input means for coupling a composite waveform to the speech code generator, pre-emphasis means for producing a signal having crossover points corresponding to the frequencies contained in the original composite waveform, clipper means operatively receiving the signal from the output of said pre-emphasis means for infinitely clipping the output signal from the pre-emphasis means thereby removing the noise and amplitude information and leaving frequency information, pulse generating means operatively coupled to the output of said clipping means for producing pulses corresponding to the crossover points of the infinitely clipped signal, channel coding means operatively coupled to the output of said pulse generating means and producing a coded train of pulses for each input pulse received from said pulse generating means; and transmitter means operatively coupled to the outputs of said multiplicity of speech code generators for receiving coded trains of pulses and radiating said trains of pulses.

9. A clipped speech channel coded communication receiver comprising; input means for receiving radiated energy containing trains of pulses therein; channel decoder means operatively connected to said input means and comprising means for receiving said trains of pulses and retaining said trains of pulses; a multiplicity of channel coincidence circuit means operatively connected to the output of said channel decoder means for selecting a coded train of pulses corresponding to a particular channel input and producing an output pulse when the coded train of pulses is coincident therein; intelligence restoring means each restoring means being operatively connected to each of said coincidence circuit means and comprising means for converting output pulses from said coincidence circuit means to a clipped waveform; and output means operatively connected to said converting means for reproducing intelligence corresponding to an original composite waveform.

10. A clipped speech channel coded communications network comprising a multiplicity of communications units; each of said communications units containing at least one transmitter section and at least one receiver section; each transmitter section containing a multiplicity of code generating means comprising pulse generating means for generating pulses corresponding to the zero crossover points of an input signal to the respective code generating means, channel coding means operatively coupled to each of said pulse generating means for producing coded trains of pulses for each pulse received therein; and transmitting means for radiating said coded trains of pulses; each of said receiver sections comprising; means for receiving and detecting trains of pulses; channel decoder means operatively coupled to said input means comprising, delay means for retaining said trains of pulses, a number of channel coincidence circuits corresponding to the number of channels operatively coupled to said delay means, each said coincidence circuit producing an output pulse therefrom when an appropriately coded train of pulses is coincident therein; and intelligence restoring means operatively coupled to each of said coincident circuit means for producing a signal corresponding substantially to said original input signal.

* * * * *